(12) United States Patent
Bruce

(10) Patent No.: US 12,221,928 B2
(45) Date of Patent: *Feb. 11, 2025

(54) ELECTRICAL SYSTEMS

(71) Applicant: ROLLS-ROYCE PLC, London (GB)

(72) Inventor: Graham P Bruce, Derby (GB)

(73) Assignee: ROLLS-ROYCE plc, London (GB)

(*) Notice: Subject to any disclaimer, the term of this patent is extended or adjusted under 35 U.S.C. 154(b) by 46 days.

This patent is subject to a terminal disclaimer.

(21) Appl. No.: 18/141,005

(22) Filed: Apr. 28, 2023

(65) Prior Publication Data

US 2023/0265799 A1 Aug. 24, 2023

Related U.S. Application Data

(63) Continuation of application No. 17/108,452, filed on Dec. 1, 2020, now Pat. No. 11,680,529.

(30) Foreign Application Priority Data

Dec. 6, 2019 (GB) .................................. 1917887

(51) Int. Cl.
*F02C 7/36* (2006.01)
*B64D 27/02* (2006.01)
(Continued)

(52) U.S. Cl.
CPC .................. *F02C 7/36* (2013.01); *H02J 3/36* (2013.01); *H02K 7/1823* (2013.01);
(Continued)

(58) Field of Classification Search
CPC . F02C 7/36; H02J 3/36; H02K 7/1823; B64D 27/026; B64D 27/10; B64D 27/24
(Continued)

(56) References Cited

U.S. PATENT DOCUMENTS 4,500,827 A * 2/1985 Merritt .................. H02K 35/02
322/3
4,661,762 A 4/1987 Baker
(Continued)

FOREIGN PATENT DOCUMENTS

EP 2 608 383 A1 6/2013

OTHER PUBLICATIONS

Mar. 7, 2024 Search Report issued in European Patent Application No. 20206664.3.
(Continued)

*Primary Examiner* — Charles Reid, Jr.
(74) *Attorney, Agent, or Firm* — Oliff PLC

(57) ABSTRACT

An electrical system for connecting a rotary electric machine to dc networks operating at different voltages V and W where V>W, the electric machine has N=4 polyphase winding sets. The electrical system includes a first set of N=4 ac-dc converter circuits connected in a modular multilevel configuration, each ac-dc converter circuit having a respective index n=(1, . . . , 4) and an ac interface for connection with a corresponding nth winding set, and in which the modular multilevel configuration has P=5 dc outputs each having a respective index p=(1, . . . , 5), and a set of N=4 dc-dc converter circuits each having a respective index n=(1, . . . , 4) and being configured to convert dc power between a voltage V/4 at a first dc interface and a voltage W at a second dc interface.

15 Claims, 10 Drawing Sheets

(51) Int. Cl.
  *B64D 27/10* (2006.01)
  *B64D 27/24* (2024.01)
  *H02J 3/36* (2006.01)
  *H02K 7/18* (2006.01)

(52) U.S. Cl.
  CPC ............ *B64D 27/026* (2024.01); *B64D 27/10* (2013.01); *B64D 27/24* (2013.01)

(58) Field of Classification Search
  USPC ...................................................... 244/53 R
  See application file for complete search history.

(56) References Cited

U.S. PATENT DOCUMENTS

| | | | |
|---|---|---|---|
| 4,780,659 A | 10/1988 | Bansal et al. | |
| 7,939,970 B1 | 5/2011 | Walling et al. | |
| 8,823,332 B2 | 9/2014 | Smout | |
| 2008/0136187 A1* | 6/2008 | Liao ........................ | F03D 9/25 |
| | | | 290/55 |
| 2009/0295319 A1 | 12/2009 | Rouis | |
| 2014/0346897 A1 | 11/2014 | Wangemann et al. | |
| 2015/0061606 A1 | 3/2015 | Pan et al. | |
| 2015/0123463 A1 | 5/2015 | Huang et al. | |
| 2016/0036220 A1 | 2/2016 | Lacaux et al. | |
| 2017/0133858 A1 | 5/2017 | Pan et al. | |
| 2017/0197730 A1 | 7/2017 | Lutze et al. | |
| 2017/0306928 A1 | 10/2017 | Tahata et al. | |
| 2018/0266329 A1 | 9/2018 | Mackin | |
| 2019/0308511 A1 | 10/2019 | Bindl et al. | |
| 2021/0078429 A1 | 3/2021 | Li et al. | |

OTHER PUBLICATIONS

M. Di Benedetto et al. "Analyis and Design of 5-Level E-Type ISOP Rectifier for High Speed Gen-Set Applications", International Symposium on Power Electronics, Electrical Drives, Automation and Motion, Jun. 20, 2018, pp. 667-672.

Apr. 20, 2021 extended Search Report issued in European Patent Application No. 20206664.3.

Zhu, H. et al., "Topology and Operation Mechanism of Monopolar-to-Bipolar DC-DC Converter Interface for DC Grid," 2016 IEEE 8th International Power Electronics and Motion Control Conference (IPEMC-ECCE Asia), 6 pp. (Year: 2016).

May 19, 2022 Office Action issued in European Patent Application No. 20206664.3.

May 10, 2021 extended Search Report issued in European Patent Application No. 20206665.0.

Jan. 4, 2022 Notice of Allowance issued in U.S. Appl. No. 17/108,476.

* cited by examiner

ELECTRICAL SYSTEMS

CROSS-REFERENCE TO RELATED APPLICATIONS

This is a Continuation of application Ser. No. 17/108,452 filed Dec. 1, 2020, which claims the benefit of priority from United Kingdom patent application number 1917887.0, filed on 6 Dec. 2019, the entire contents of which are incorporated herein by reference.

TECHNICAL FIELD

This disclosure relates to electrical systems for connecting a rotary electric machine to dc networks operating at different voltages.

BACKGROUND

In aerospace, the more electric engine (MEE) and more electric aircraft (MEA) concepts are seen as being increasingly attractive due to their potential to reduce fuel consumption. For example, one known aircraft configuration includes electric machines in its engines which are operable as both motors and generators. This facilitates both generation of electrical power during flight and starting of the engine, allowing removal of the air-turbine starter and attendant bleed air ducting. One engine configuration for this known aircraft includes such electric machines coupled to the high-pressure spool of a twin-spool turbofan. Another includes such electric machines coupled to the intermediate-pressure spool of a triple-spool turbofan.

Analysis has shown that further reduction in fuel consumption may be achieved by generating electrical power by the low-pressure spool. In conjunction with this, it has also been shown that transfer of power between the low- and high-pressure spools also improves fuel efficiency at a number of phases in the operational envelope. In an example, approximately 1 megawatt of power may be produced from the low-pressure shaft, with 400 kilowatts being transferred to the high-pressure spool and the remaining power supplied to the airframe.

It is also contemplated that future airframe designs may incorporate fuselage boundary layer ingestion systems to reduce wake drag, further reducing fuel consumption. Most practical proposals are based on tube-and-wing twinjets, in which the underwing turbofan engines also operate as turboelectric generators for supplying power to an electrically-driven boundary layer ingestion fan at the tail of the aircraft. Such aft-mounted fans may command in excess of 2 megawatts to operate effectively. Thus, each turbofan engine may be required to produce an additional 1 megawatt of electrical power for the airframe.

In such scenarios, therefore, medium voltage (as defined by IEC 60038:2009, i.e. 1 kilovolt ac or greater) electrical systems will be required to maintain acceptable current ratings, as too high a current has a detrimental effect in terms of Joule losses and conductor weight. However, it is desirable to reduce the number of systems operating at medium voltage due to the risk of arcing and corona at altitude, thus adopting low voltage ratings for the lower powered systems.

Thus, it is an object of the invention to provide an electrical system to facilitate transfer of power between electrical networks operating at different voltages.

In this specification, the following mathematical notation is assigned to objects for the purposes of clarity and conciseness. A collection of objects having an ordered relationship therebetween may be represented as a sequence of members. For a finite sequence $\gamma$ of length N, each member has an associated index n identifying its position in the sequence.

As used herein, the length of a sequence is denoted by an uppercase letter, with the variable representing the indices of the members of the sequence denoted by the equivalent lowercase letter. In this way it is possible herein to concisely define properties of each member of a sequence.

For example, let a sequence $\alpha$ have length N=8 such that the members each have an associated index n. It is possible to state that for all n≡0 (mod 2), the nth member has property X. In this way a particular property is defined over the even-indexed members.

This is in contrast to having to set out that each of the second member, the fourth member, the sixth member, and the eighth member has property X.

Thus it may be seen that great improvements in conciseness are possible for sequences of large length with properties shared over a mathematically-defined sub-sequence.

Furthermore, say we wish to describe links between the members of a multiplicity of sequences. For example, let a sequence $\beta$ have a length P=3, and let a sequence $\gamma$ also have a length P=3. The members of both sequences therefore have an index p associated therewith.

Given these definitions, we may concisely state that for all p=(1 ... P), the pth member of sequence $\beta$ is linked to the pth member of sequence $\gamma$.

This is in contrast to having to set out that the first member of sequence $\beta$ is linked to the first member of sequence $\gamma$, the second member of sequence $\beta$ is linked to the second member of set $\gamma$, and the third member of sequence $\beta$ is linked to the third member of sequence $\gamma$.

Whilst the statements are equivalent, it will be appreciated that by using the notation explained heretofore significant improvements in conciseness are achieved.

SUMMARY

The invention is directed to electrical systems for connecting electric machines to dc networks operating at different voltages V and W, along with gas turbine engine arrangements incorporating such systems.

In an aspect, there is provided an electrical system of the aforesaid type, where V>W, the electric machine having N≥2 polyphase winding sets each having a respective index n=(1, ... , N), the electrical system comprising:
  a first set of N ac-dc converter circuits connected in a modular multilevel configuration, each ac-dc converter circuit having a respective index n=(1, ... , N) and an ac interface for connection with a corresponding nth winding set, and in which the modular multilevel configuration has P=N+1 dc outputs each having a respective index p=(1, ... , P) wherein the potential difference between the pth output and the (p+q)th output is qV/N, where q=(0, ... , P−p);
  a set of N dc-dc converter circuits each having a respective index n=(1, ... , N) and being configured to convert dc power between a voltage V/N at a first dc interface and a voltage W at a second dc interface, wherein, for all n, a first dc interface of the nth dc-dc converter circuit is connected with the p=nth and p=(n+1)th dc outputs of the modular multilevel configuration.

In an embodiment, 0.5 W≤V/N≤2 W.
In an embodiment, 0.8 W≤V/N≤1.3 W.
In an embodiment, N=4.

In an embodiment, W is 540 volts.

In an embodiment, V is from 1 kilovolt to 10 kilovolts.

In an embodiment, V is from 1 kilovolt to 3 kilovolts.

In an embodiment, the first set of N ac-dc converter circuits are bidirectional ac-dc converter circuits.

In an embodiment, the first set of N ac-dc converter circuits comprise H-bridges.

In an embodiment, the set of dc-dc converter circuits comprise phase-shifted full bridges.

In an embodiment, the electrical system further comprises:
- a second set of N ac-dc converter circuits each having a respective index n=(1, ..., N), wherein for all n, a dc interface of the nth one of the second set of ac-dc converter circuits is connected with a second dc interface of the nth dc-dc converter;
- a second electric machine having N polyphase winding sets, each having a respective index n=(1, ..., N), wherein for all n, the nth winding set of the second electric machine is connected with an ac interface of the nth one of the second set of ac-dc converter circuits.

In an embodiment, the electrical system further comprises:
- a second set of N ac-dc converter circuits each having a respective index n=(1, ..., N), wherein for all n, a dc interface of the nth one of the second set of ac-dc converter circuits is connected with a second dc interface of the nth dc-dc converter;
- a second rotary electric machine having N independent phases each having a respective index n=(1, ..., N), wherein for all n, the nth phase of the second electric machine is connected with an ac interface of the nth one of the second set of ac-dc converter circuits.

In an embodiment, the second set of N ac-dc converter circuits are bidirectional ac-dc converter circuits.

In an embodiment, the second set of N ac-dc converter circuits comprise H-bridges.

In another aspect, there is provided a gas turbine engine having a low-pressure spool and a high-pressure spool, and further comprising an electrical system as set out herein, in which the first rotary electric machine is connected with the low-pressure spool and the second rotary electric machine is connected with the high-pressure spool.

In another aspect, there is provided:
- a first gas turbine engine having a first spool;
- a second gas turbine engine different from the first gas turbine engine, and having a second spool; and
- and further comprising an electrical system as set out herein, in which the first rotary electric machine is connected with the first spool and the second rotary electric machine is connected with the second spool.

BRIEF DESCRIPTION OF THE DRAWINGS

Embodiments will now be described by way of example only with reference to the accompanying drawings, which are purely schematic and not to scale, and in which.

DETAILED DESCRIPTION

FIG. 1

Figure 1:
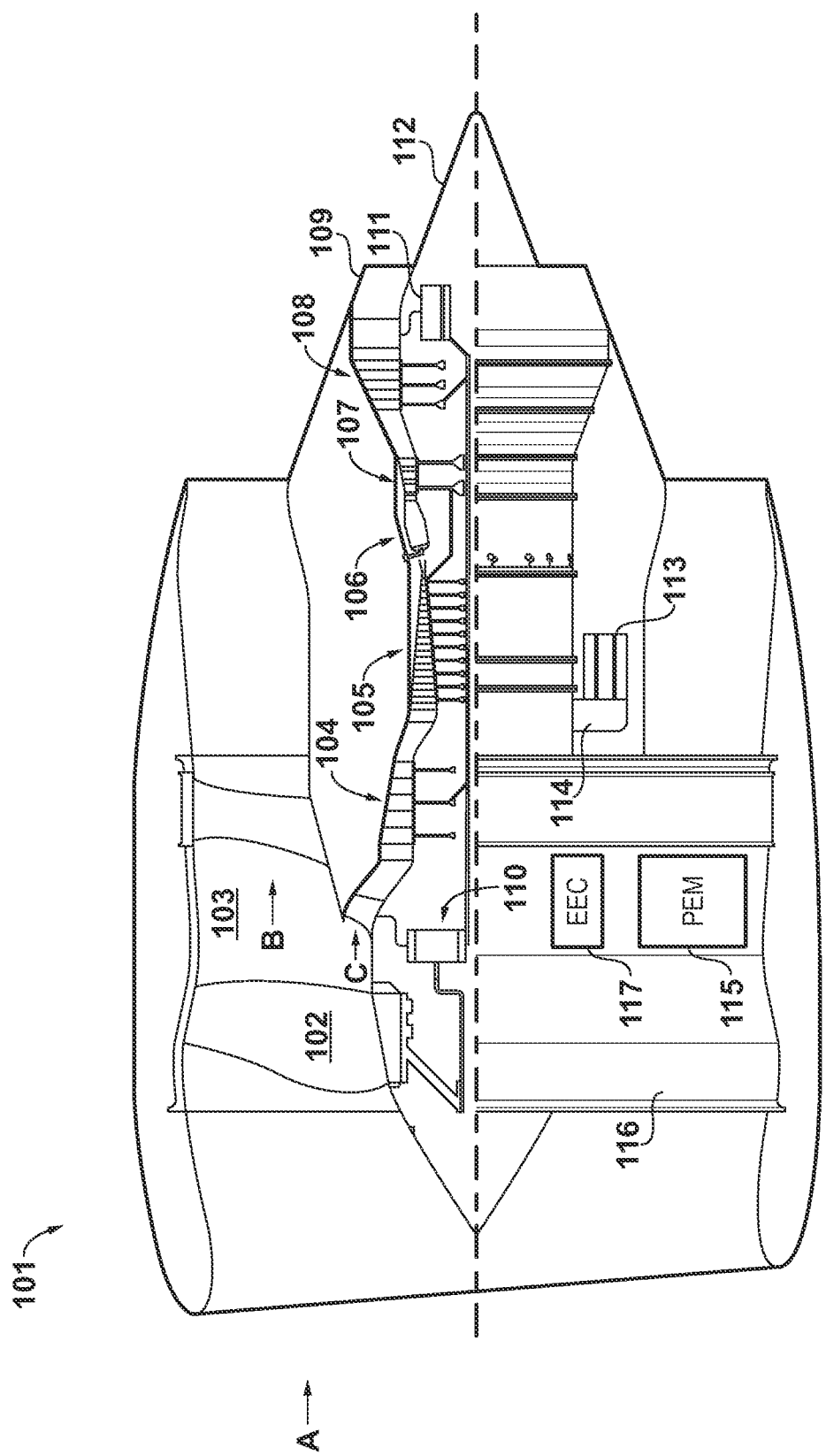
FIG. 1 shows general arrangement of an engine for an aircraft, including an electric machine on each spool.

A general arrangement of an engine 101 for an aircraft is shown in FIG. 1. In the present embodiment, the engine 101 is of turbofan configuration, and thus comprises a ducted fan 102 that receives intake air A and generates two pressurised airflows: a bypass flow B which passes axially through a bypass duct 103 and a core flow C which enters a core gas turbine.

The core gas turbine comprises, in axial flow series, a low-pressure compressor 104, a high-pressure compressor 105, a combustor 106, a high-pressure turbine 107, and a low-pressure turbine 108.

In operation, the core flow C is compressed by the low-pressure compressor 104 and is then directed into the high-pressure compressor 105 where further compression takes place. The compressed air exhausted from the high-pressure compressor 105 is directed into the combustor 106 where it is mixed with fuel and the mixture is combusted. The resultant hot combustion products then expand through, and thereby drive, the high-pressure turbine 107 and thereafter the low-pressure turbine 108 before being exhausted through a core nozzle 109 to provide a proportion of the overall thrust.

The high-pressure turbine 107 drives the high-pressure compressor 105 via an interconnecting shaft. The low-pressure turbine 108 drives the low-pressure compressor 104 via another interconnecting shaft. Together, the high-pressure compressor 105, high-pressure turbine 107, and associated interconnecting shaft form a high-pressure spool of the engine 101. Similarly, the low-pressure compressor 104, low-pressure turbine 108, and associated interconnecting shaft form a low-pressure spool of the engine 101. Such nomenclature will be familiar to those skilled in the art.

In the present embodiment, the engine 101 is a geared turbofan, whereby the fan 102 is driven by the low-pressure turbine 108 via a reduction gearbox 110. In the present embodiment, the reduction gearbox 110 is an epicyclic gearbox. In the particular configuration illustrated in FIG. 1, the epicyclic gearbox is a planetary-configuration epicyclic gearbox. Thus, the low-pressure turbine 108 is connected with a sun gear of the gearbox 110, which is meshed with a plurality of planet gears located in a rotating carrier, which planet gears are in turn are meshed with a static ring gear. The rotating carrier drives the fan 102.

It will be appreciated that in alternative embodiments a star-configuration epicyclic gearbox (in which the planet carrier is static and the ring gear rotates and provides the output) may be used instead. Furthermore, different reduction gearbox configurations could also be used, such as step-aside, layshaft, etc.

In the present embodiment, a first rotary electric machine 111 is mechanically coupled with the low-pressure spool. In this specific embodiment, the first electric machine 111 is mounted in the tail cone 112 of the engine 101 coaxially with the turbomachinery and is coupled to the low-pressure turbine 108. In an embodiment, the first electric machine 111 is configured to operate as a motor to drive the low-pressure spool, facilitating, for example, rotation of the fan 102 by electric power alone or electrical augmentation of said rotation. In another embodiment, the first electric machine 111 is configured to operate as a generator to provide electrical power. In the present embodiment, the first electric machine 111 is configured as a motor-generator allowing both power extraction from and power injection to the low-pressure spool. The mode of operation may vary depending on flight phase to improve operability, fuel consumption, etc.

In alternative embodiments, the first electric machine 111 may be located axially in line with low-pressure compressor 104, which may adopt a bladed disc or bladed drum configuration to provide space for the first electric machine 111.

In the present embodiment, a second rotary electric machine 113 is mechanically coupled with the high-pressure spool. In this specific embodiment, the second electric machine 113 is coupled to the high-pressure spool via a high-pressure spool driven, core-mounted accessory gearbox 114 of conventional drive configuration, for example via a tower-shaft. In an embodiment, the second electric machine 113 is configured to operate as a motor to drive the high-pressure spool, facilitating, for example, starting of the engine 101. In another embodiment, the second electric machine 113 is configured to operate as a generator to provide electrical power. In the present embodiment, the second electric machine 113 is configured as a motor-generator allowing both power extraction from and power injection to the high-pressure spool. The mode of operation may vary depending on flight phase to improve operability, fuel consumption, etc.

In alternative embodiments, the second electric machine 113 may be mounted coaxially with the turbomachinery in the engine 101. For example, the second electric machine 113 may be mounted axially in line with the duct between the low- and high-pressure compressors 104 and 105.

It will of course be appreciated by those skilled in the art that any other suitable location for the first and second electric machines may be adopted.

In the present embodiment, the first and second electric machines are connected with power electronics. Extraction of power from, or application of power to, the electric machines is performed by a power electronics module (PEM) 115. In the present embodiment, the PEM 115 is mounted on the fan case 116 of the engine 101, but it will be appreciated that it may be mounted elsewhere such as on the core of the gas turbine, or in the vehicle to which the engine 101 is attached, for example. Further, different parts of the PEM 115 may be distributed between different locations. For example, some components may be mounted on the engine 101 and some may be mounted in the vehicle to which the engine 101 is attached.

Control of the PEM 115 and thus of the first and second electric machines 111 and 113 is in the present example performed by an electronic engine controller (EEC) 117. In the present embodiment the EEC 117 is a full-authority digital engine controller (FADEC), the configuration of which will be known and understood by those skilled in the art. It therefore controls all aspects of the engine 101, i.e. both of the core gas turbine and the first and second electric machines 111 and 113. In this way, the EEC 117 may holistically respond to both thrust demand and electrical power demand.

As set out previously, in the present embodiment the first electric machine 111 and the second electric machine 113 may both be configured as motor-generators. The mode of operation of each of the first electric machine 111 and the second electric machine 113 may thus be adjusted in concert to transfer power to and from the high- and low-pressure spools. In this way, the turbomachinery may be designed to exploit the attendant advantages conferred by transfer of power between the high-pressure spool and the low-pressure spool. For example, transfer of power from the low-pressure spool to the high-pressure spool during the approach phase reduces the effective thrust of the engine 101 whilst maintaining sufficient high-pressure spool rotational speed to safely initiate a go-around manoeuvre. Further, in engine 101, transfer of power from the high-pressure spool to the low-pressure spool during a deceleration manoeuvre reduces the risk of weak extinction, therefore enabling a more optimal combustor design.

The configuration and operation of the electrical system will be described with reference to FIG. 2, and the configuration of the electric machines will be described further with reference to FIGS. 3A and 3B.

Various embodiments of the engine 101 may include one or more of the following features.

It will be appreciated that instead of being a turbofan having a ducted fan arrangement, the engine 101 may instead be a turboprop comprising a propeller for producing thrust.

The low- and high-pressure compressors 104 and 105 may comprise any number of stages, for example multiple stages. Each stage may comprise a row of rotor blades and a row of stator vanes, which may be variable stator vanes (in that their angle of incidence may be variable). In addition to, or in place of, axial stages, the low- or high-pressure compressors 104 and 105 may comprise centrifugal compression stages.

The low- and high-pressure turbines 107 and 108 may also comprise any number of stages.

The fan 102 may have any desired number of fan blades, for example 16, 18, 20, or 22 fan blades.

Each fan blade may be defined as having a radial span extending from a root (or hub) at a radially inner gas-washed location, or 0 percent span position, to a tip at a 100 percent span position. The ratio of the radius of the fan blade at the hub to the radius of the fan blade at the tip—the hub-tip ratio—may be less than (or on the order of) any of: 0.4, 0.39, 0.38 0.37, 0.36, 0.35, 0.34, 0.33, 0.32, 0.31, 0.3, 0.29, 0.28, 0.27, 0.26, or 0.25. The hub-tip ratio may be in an inclusive range bounded by any two of the aforesaid values (i.e. the values may form upper or lower bounds). The hub-tip ratio may both be measured at the leading edge (or axially forwardmost) part of the blade. The hub-tip ratio refers, of course, to the gas-washed portion of the fan blade, i.e. the portion radially outside any platform.

The radius of the fan 102 may be measured between the engine centreline and the tip of a fan blade at its leading edge. The fan diameter may be greater than (or on the order of) any of: 2.5 metres, 2.6 metres, 2.7 metres, 2.8 metres, 2.9 metres, 3 metres, 3.1 metres, 3.2 metres, 3.3 metres, 3.4 metres, 3.5 metres, 3.6 metres, 3.7 metres, 3.8 metres or 3.9 metres. The fan diameter may be in an inclusive range bounded by any two of the aforesaid values (i.e. the values may form upper or lower bounds).

The rotational speed of the fan 102 may vary in use. Generally, the rotational speed is lower for fans with a higher diameter. Purely by way of non-limitative example, the rotational speed of the fan at cruise conditions may be less than 2500 rpm, for example 2300 rpm. Purely by way of further non-limitative example, the rotational speed of the fan 102 at cruise conditions for an engine having a fan diameter in the range of from 2.5 metres to 3 metres (for example 2.5 metres to 2.8 metres) may be in the range of from 1700 rpm to 2500 rpm, for example in the range of from 1800 rpm to 2300 rpm, or, for example in the range of from 1900 rpm to 2100 rpm. Purely by way of further non-limitative example, the rotational speed of the fan at cruise conditions for an engine having a fan diameter in the range of from 3.2 metres to 3.8 metres may be in the range of from 1200 rpm to 2000 rpm, for example in the range of from 1300 rpm to 1800 rpm, for example in the range of from 1400 rpm to 1600 rpm.

In use of the engine 101, the fan 102 (with its associated fan blades) rotates about a rotational axis. This rotation results in the tip of the fan blade moving with a velocity $U_{tip}$. The work done by the fan blades on the flow results in an enthalpy rise dH of the flow. A fan tip loading may be defined as $dH/U_{tip}^2$, where dH is the enthalpy rise (for example the one-dimensional average enthalpy rise) across the fan and $U_{tip}$ is the (translational) velocity of the fan tip, for example at the leading edge of the tip (which may be defined as fan tip radius at leading edge multiplied by angular speed). The fan tip loading at cruise conditions may be greater than (or on the order of) any of: 0.3, 0.31, 0.32, 0.33, 0.34, 0.35, 0.36, 0.37, 0.38, 0.39 or 0.4. The fan tip loading may be in an inclusive range bounded by any two of the values in the previous sentence (i.e. the values may form upper or lower bounds).

The engine 101 may have any desired bypass ratio, where the bypass ratio is defined as the ratio of the mass flow rate of the flow B through the bypass duct to the mass flow rate of the flow C through the core at cruise conditions. Depending upon the selected configuration, the bypass ratio may be greater than (or on the order of) any of the following: 10, 10.5, 11, 11.5, 12, 12.5, 13, 13.5, 14, 14.5, 15, 15.5, 16, 16.5, or 17. The bypass ratio may be in an inclusive range bounded by any two of the aforesaid values (i.e. the values may form upper or lower bounds). The bypass duct may be substantially annular. The bypass duct may be radially outside the core engine. The radially outer surface of the bypass duct may be defined by a nacelle and/or a fan case.

The overall pressure ratio of the engine 101 may be defined as the ratio of the stagnation pressure upstream of the fan 102 to the stagnation pressure at the exit of the high-pressure compressor 105 (before entry into the combustor). By way of non-limitative example, the overall pressure ratio of the engine 101 at cruise may be greater than (or on the order of) any of the following: 35, 40, 45, 50, 55, 60, 65, 70, 75. The overall pressure ratio may be in an inclusive range bounded by any two of the aforesaid values (i.e. the values may form upper or lower bounds).

Specific thrust of the engine 101 may be defined as the net thrust of the engine divided by the total mass flow through the engine 101. At cruise conditions, the specific thrust of the engine 101 may be less than (or on the order of) any of the following: 110 Nkg$^{-1}$s, 105 Nkg$^{-1}$s, 100 Nkg$^{-1}$s, 95 Nkg$^{-1}$s, 90 Nkg$^{-1}$s, 85 Nkg$^{-1}$s, or 80 Nkg$^{-1}$s. The specific thrust may be in an inclusive range bounded by any two of the values in the previous sentence (i.e. the values may form upper or lower bounds). Such engines may be particularly efficient in comparison with conventional gas turbine engines.

The engine 101 may have any desired maximum thrust. For example, the engine 101 may be capable of producing a maximum thrust of at least (or on the order of) any of the following: 160 kilonewtons, 170 kilonewtons, 180 kilonewtons, 190 kilonewtons, 200 kilonewtons, 250 kilonewtons, 300 kilonewtons, 350 kilonewtons, 400 kilonewtons, 450 kilonewtons, 500 kilonewtons, or 550 kilonewtons. The maximum thrust may be in an inclusive range bounded by any two of the aforesaid values (i.e. the values may form upper or lower bounds). The thrust referred to above may be the maximum net thrust at standard atmospheric conditions at sea level plus 15 degrees Celsius (ambient pressure 101.3 kilopascals, temperature 30 degrees Celsius), with the engine 101 being static.

In use, the temperature of the flow at the entry to the high-pressure turbine 107 may be particularly high. This temperature, which may be referred to as turbine entry temperature or TET, may be measured at the exit to the combustor 106, for example immediately upstream of the first turbine vane, which itself may be referred to as a nozzle guide vane. At cruise, the TET may be at least (or on the order of) any of the following: 1400 kelvin, 1450 kelvin, 1500 kelvin, 1550 kelvin, 1600 kelvin or 1650 kelvin. The TET at cruise may be in an inclusive range bounded by any two of the aforesaid values (i.e. the values may form upper or lower bounds). The maximum TET in use of the engine 101 may be, for example, at least (or on the order of) any of the following: 1700 kelvin, 1750 kelvin, 1800 kelvin, 1850 kelvin, 1900 kelvin, 1950 kelvin or 2000 kelvin. The maximum TET may be in an inclusive range bounded by any two of the aforesaid values (i.e. the values may form upper or lower bounds). The maximum TET may occur, for example, at a high thrust condition, for example at a maximum take-off (MTO) condition.

A fan blade and/or aerofoil portion of a fan blade described and/or claimed herein may be manufactured from any suitable material or combination of materials. For example, at least a part of the fan blade and/or aerofoil may be manufactured at least in part from a composite, for example a metal matrix composite and/or an organic matrix composite, such as carbon fibre. By way of further example at least a part of the fan blade and/or aerofoil may be manufactured at least in part from a metal, such as a titanium-based metal or an aluminium based material (such as an aluminium-lithium alloy) or a steel-based material. The fan blade may comprise at least two regions manufactured using different materials. For example, the fan blade may have a protective leading edge, which may be manufactured using a material that is better able to resist impact (for example from birds, ice or other material) than the rest of the blade. Such a leading edge may, for example, be manufactured using titanium or a titanium-based alloy. Thus, purely by way of example, the fan blade may have a carbon-fibre or aluminium-based body with a titanium leading edge.

The fan 102 may comprise a central hub portion, from which the fan blades may extend, for example in a radial direction. The fan blades may be attached to the central portion in any desired manner. For example, each fan blade may comprise a fixture which may engage a corresponding slot in the hub. Purely by way of example, such a fixture may be in the form of a dovetail that may slot into and/or engage a corresponding slot in the hub/disc in order to fix the fan blade to the hub. By way of further example, the fan blades maybe formed integrally with a central hub portion. Such an arrangement may be a bladed disc or a bladed ring. Any suitable method may be used to manufacture such a bladed disc or bladed ring. For example, at least a part of the fan blades may be machined from a billet and/or at least part of the fan blades may be attached to the hub/disc by welding, such as linear friction welding.

The engine 101 may be provided with a variable area nozzle (VAN). Such a variable area nozzle may allow the exit area of the bypass duct to be varied in use. The general principles of the present disclosure may apply to engines with or without a VAN.

As used herein, cruise conditions have the conventional meaning and would be readily understood by those skilled in the art.

Such cruise conditions may be conventionally defined as the conditions at mid-cruise, for example the conditions experienced by the aircraft and/or engine at the midpoint (in terms of time and/or distance) between top of climb and start of descent. Cruise conditions thus define an operating point of the gas turbine engine which provides a thrust that would ensure steady state operation (i.e. maintaining a constant altitude and constant Mach number) at mid-cruise of an aircraft to which it is designed to be attached, taking into account the number of engines provided to that aircraft. For example, where an engine is designed to be attached to an aircraft that has two engines of the same type, at cruise conditions the engine provides half of the total thrust that would be required for steady state operation of that aircraft at mid-cruise.

In other words, for a given gas turbine engine for an aircraft, cruise conditions are defined as the operating point of the engine that provides a specified thrust (required to provide—in combination with any other engines on the aircraft—steady state operation of the aircraft to which it is designed to be attached at a given mid-cruise Mach number) at the mid-cruise atmospheric conditions (defined by the International Standard Atmosphere according to ISO 2533 at the mid-cruise altitude). For any given gas turbine engine for an aircraft, the mid-cruise thrust, atmospheric conditions and Mach number are known, and thus the operating point of the engine at cruise conditions is clearly defined.

The cruise conditions may correspond to ISA standard atmospheric conditions at an altitude that is in the range of from 10000 to 15000 metres, such as from 10000 to 12000 metres, or from 10400 to 11600 metres (around 38000 feet), or from 10500 to 11500 metres, or from 10600 to 11400 metres, or from 10700 metres (around 35000 feet) to 11300 metres, or from 10800 to 11200 metres, or from 10900 to 11100 metres, or 11000 metres. The cruise conditions may correspond to standard atmospheric conditions at any given altitude in these ranges.

The forward speed at the cruise condition may be any point in the range of from Mach 0.7 to 0.9, for example one of Mach 0.75 to 0.85, Mach 0.76 to 0.84, Mach 0.77 to 0.83, Mach 0.78 to 0.82, Mach 0.79 to 0.81, Mach 0.8, Mach 0.85, or in the range of from Mach 0.8 to 0.85. Any single speed within these ranges may be the cruise condition. For some aircraft, the cruise conditions may be outside these ranges, for example below Mach 0.7 or above Mach 0.9.

Thus, for example, the cruise conditions may correspond specifically to a pressure of 23 kilopascals, a temperature of minus 55 degrees Celsius, and a forward Mach number of 0.8.

It will of course be appreciated, however, that the principles of the invention claimed herein may still be applied to engines having suitable design features falling outside of the aforesaid parameter ranges.

FIG. 2

Figure 2:
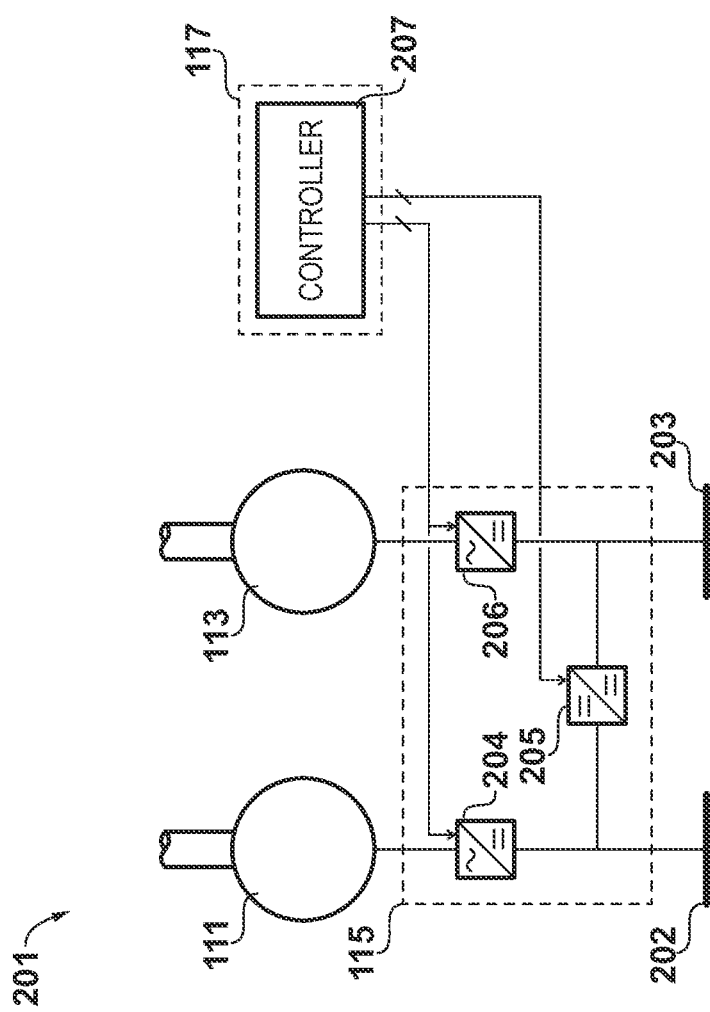
FIG. 2 shows an electrical system suitable for the engine of FIG. 1.

An electrical system 201 for connecting the first electric machine 111 to a first dc network 202 and a second dc network 203 operating at different voltages is shown in FIG. 2. The electrical system 201 is shown in the form of a single line diagram, the conventions of which will be familiar to those skilled in the art. Thus for alternating current (ac) a single line replaces a plurality of polyphase lines, and for direct current (dc) a single line replaces the +V and −V lines.

In the present embodiment, the first electric machine 111 is connected with the first dc network 202 via a first set of ac-dc converter circuits 204. In the illustrated embodiment, the first set of ac-dc converter circuits 204 form part of the PEM 115. As set out previously, in the present embodiment the first electric machine 111 is configured as a motor-generator and thus the first set of ac-dc converter circuits 204 are bidirectional ac-dc converter circuits. In a specific embodiment, the ac-dc converter circuits 204 are half-bridge voltage source converter circuits, the topology of which will be described with reference to FIG. 7. The ac-dc converter circuits may however be any suitable alternative topology such as full-bridge, neutral-point clamped, etc. Further, as described previously in alternative embodiments the first electric machine 111 may be configured solely as a generator or a solely as a motor, in which case the first set of ac-dc converter circuits 204 may be configured as unidirectional ac-dc converter circuits.

The first dc network operates at a first voltage V. The second dc network 203 operates at a second voltage W. The first voltage V is greater than the second voltage W, i.e. V>W. The voltages referred to herein may be a nominal voltage for each dc network, which definition is applicable when the voltages are substantially fixed. In alternative embodiments, the voltages referred to herein may be the actual operational voltages, which definition is appropriate particularly in the case of variable dc voltage networks.

A set of dc-dc converter circuits 205 is therefore provided to convert dc power between the first voltage V at a first dc interface and the second voltage W at a second dc interface so as to allow power to be transferred from the first dc networks 202 to the second dc network 203. In the illustrated embodiment, the set of dc-dc converter circuits 204 also form part of the PEM 115. In a specific embodiment, the set of dc-dc converter circuits 204 comprises phase-shifted full bridge circuits, the topology of which will be described with reference to FIG. 8. The dc-dc converter circuits may however be any suitable alternative topology which provides isolation between input and output to accommodate different absolute voltage levels, such as a hard-switch pulse width modulated type, a resonant type, or a soft-switching type. For example, the dc-dc converter circuits may be isolated forward converters, or isolated push-pull converters, etc.

In the present embodiment, the electrical system 201 further encompasses the second electric machine 113. In this configuration, the second electric machine 113 is connected to the second dc network 203 via a second set of ac-dc converters 206.

The configuration of the ac-dc converters and dc-dc converters will be described further with reference to FIGS. 4 to 6.

In the present embodiment, a controller 207 is provided in the EEC 117. The controller 207 is configured to control the operation of the converter circuits within the PEM 115 so as to control the operation of the electric machines 111 and 113 and the transfer of power between the dc networks 202 and 203. In the present example, the controller 207 is a functional module implemented in software running on the EEC 117. It will be appreciated that in alternative embodiments the controller 207 may be implemented in hardware in the EEC 117. It will also be appreciated that the controller 207 may be a separate module in addition to the EEC 117.

Whilst the embodiment described thus far is in the context of an installation in a single gas turbine engine, it is envisaged that the electric machines could be connected to spools in different gas turbines. Further, the electrical system could be used in other applications such as connection of steam turbines and reciprocating engines, etc. or in any other suitable application.

FIGS. 3A & 3B

Figure 3B:
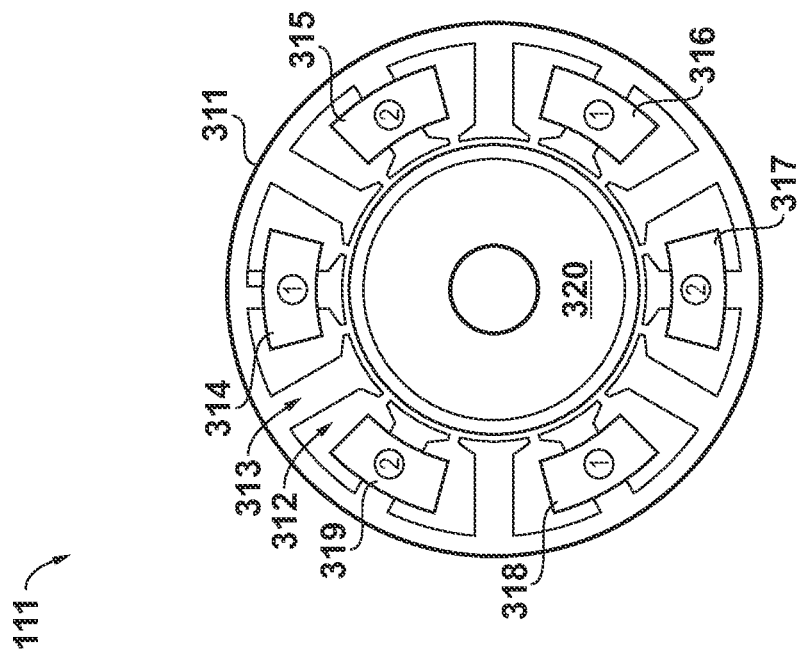
FIGS. 3A and 3B show, respectively, a first embodiment of the electrical system and a first electric machine therefor.
Figure 3A:
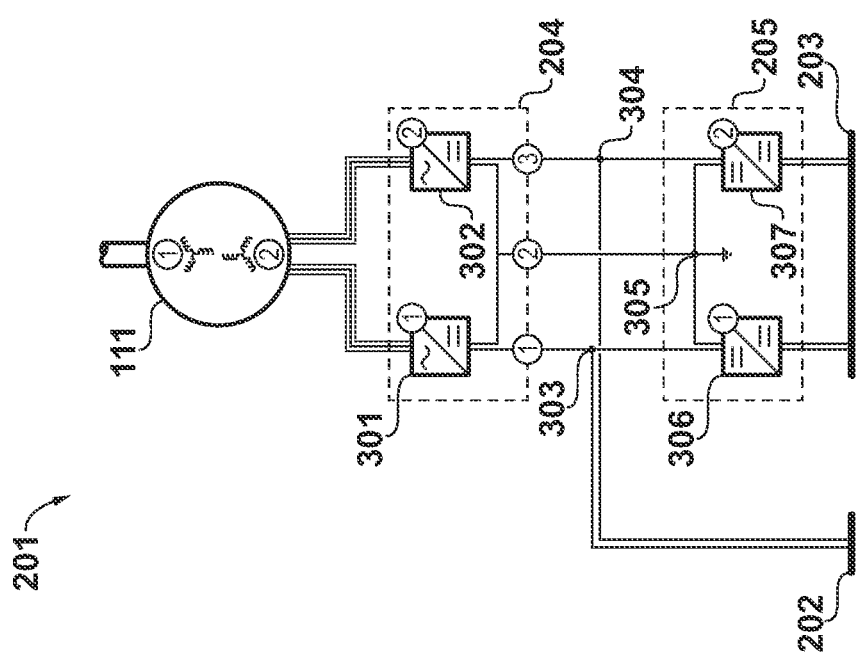

A first embodiment of the electrical system 201 is shown in FIG. 3A. As set out previously, the first electric machine 111 is a rotary electric machine having N≥2 polyphase winding sets, each having a respective index n=(1, . . . , N). As used herein, the term polyphase winding set refers to a number M≥2 of windings of any suitable configuration which are excited by and/or produce a balanced system of M polyphase voltages, i.e. substantially identical voltage waveforms offset by 2π/M radians. For example, the winding set may be a three-phase winding set, connected with a polyphase supply. One or more windings may form part of each phase, being connected in either series or parallel. The phases may be connected in a star connection. Delta connection is also possible. The winding set could comprise any other number of phases.

The presence of N polyphase winding sets provides redundancy, whereby if the drive circuit for a particular polyphase winding set fails, continued operation may be provided by the other winding set(s). In an embodiment, the second electric machine 113 is an N-tuple wound electric machine, in which each of the N polyphase winding sets are wound on the same stator around a common rotor, which configuration will be described further with reference to FIG. 3B. In another embodiment, the second electric machine 113 is an N-tuple stacked machine, in which a common rotor is shared between N coaxially connected stators each carrying one of the N polyphase winding sets. Such stacked configurations will be familiar to those skilled in the art.

Referring again to FIG. 3A, in this first embodiment of the electrical system 201, N=2. For the purposes of clarity the second electric machine 113 and the controller 207 are omitted at this stage. An embodiment of the first electric machine 111 for use with the electrical system 201 of FIG. 3A, is shown in FIG. 3B.

With N being set equal to 2 in this example, the first electric machine 111 has two polyphase winding sets having an associated index having an associated index n=(1,2). In the present example, the polyphase winding sets are three-phase windings connected in a star configuration, and identified by the two separate star winding symbols thereon in FIG. 3A. As described previously, in alternative embodiments a delta connection could be used, and other phase numbers are possible.

In order to drive each polyphase winding set in the first electric machine 111, the first set of ac-dc converter circuits 204 comprises N ac-dc converter circuits, each of which has a respective index n=(1, . . . , N). Thus, in this case, two ac-dc converter circuits are provided: a first ac-dc converter circuit 301 which has an index n=1, and a second ac-dc converter circuit 302 which has an index n=2. For ease of reference in the Figure, the indices for each ac-dc converter circuit and other indexed elements are shown as enclosed alphanumeric characters.

For all n, an ac interface of each ac-dc converter circuit is connected with the nth polyphase winding set of the first electric machine 111: thus an ac interface the first ac-dc converter circuit 301—which has index n=1—is connected with polyphase winding set 1 of the first electric machine 111, and an ac interface the first ac-dc converter circuit 301—which has index n=2—is connected with polyphase winding set 2.

The ac interfaces of first set of ac-dc converter circuits 204 are connected in such a way as to form a modular multilevel (MML) configuration having, in general terms, P=N+1 dc outputs each having a respective index p=(1, . . . , P). Thus, in this example, P=3. The first dc output, with index p=1, is provided by the lower-level voltage output of the first ac-dc converter circuit 301. The third dc output, with index p=3, is provided by the higher-level voltage output of the second ac-dc converter circuit 302.

The second dc output, with index p=2, is formed by connecting the high-level voltage output of the first ac-dc converter circuit 301 with the low-level dc voltage output of the second ac-dc converter circuit 302. This means that the voltage at these outputs of the ac-dc converter circuits are forced to be equal. Consequently, the overall dc output voltage of the MML configuration is the sum of the voltages across the respective lower- and higher-level voltage outputs of each converter circuit therein. In the present embodiment, the potential difference across the outputs of each converter circuit is the same.

In the present example, the overall dc output voltage of the first set of ac-dc converter circuits 204 is a voltage V. Thus, the potential difference between the pth dc output and the (p+q)th dc output is qV/N, where, as before, P=N+1, p=(1, . . . , P), and here q=(0, . . . , P−p).

Thus, in the example of FIG. 3A, the potential difference between the first dc output of the MML configuration (having an index of 1) and the second dc output (having an index of 2) is V/2, as in that case p=1, q=1, and N=2. The potential difference between the first output of the modular multilevel configuration and the third output (having an index of 3) is V, as in that case p=1, q=2, and N=2.

A supply for the first dc network 202 may therefore be taken across a first node 303 at the first dc output from the MML configuration, and a second node 304 at the third dc output from the MML configuration.

In the present embodiment, it will be seen that N is even and thus the second output from the modular multilevel configuration can represent a neutral point. Thus, in the present embodiment, a third node 305 at the second output from the MML configuration is connected to an electrical ground. This could be a true ground or a floating neutral in an IT grounding scheme, or any other suitable ground type. In general terms, therefore, those skilled in the art will see that for all systems where N is even, it is possible to connect the ([N/2]+1)th dc output of the MML configuration to such a ground point.

In a practical example, the voltage V may be from 1 kilovolt to 10 kilovolts. More specifically, V may be from 1 kilovolt to 3 kilovolts.

In order to convert the voltage V of the first dc network 202 to the voltage W of the second dc network 203, the set of dc-dc converter circuits 205 comprises N dc-dc converter circuits each having a respective index n=(1, . . . , N). Each of these dc-dc converter circuits is configured to convert dc power between a voltage V/N at a first dc interface and a voltage W at a second dc interface. For all n, a first dc interface of the nth dc-dc converter circuit is connected with the dc outputs of the MML configuration whose index p is equal to n and (n+1). In a practical example, voltage W is 540 volts.

In the example of FIG. 3A, the set of dc-dc converter circuits 205 comprises a first dc-dc converter circuit 306 which has an index n=1, and a second dc-dc converter circuit 307 which has an index n=2.

A first dc interface of the first dc-dc converter circuit 306 is connected with the first and second dc outputs of the MML configuration, i.e. those outputs with indices p equal to n and n+1. Similarly, a first dc interface of the second dc-dc converter circuit 307 is connected with the second and third dc outputs of the MML configuration. The first dc-dc converter circuit 306 and the second dc-dc converter circuit 307 both output voltage W at their second dc interfaces for output to the second dc network 203.

In the present example, each dc-dc converter circuit must only convert between a voltage V/2 and a voltage W, rather than a voltage V and a voltage W. It will be appreciated by those skilled in the art that as the difference between voltage V and voltage W increases, the approach of the present invention reduces the difference in voltage across the dc-dc converter circuits, thereby reducing losses, mass and volume.

A first embodiment of the first electric machine 111 is shown in FIG. 3B, which suitable for use in the system of FIG. 3A. In the present embodiment, with N equal to 2, the first electric machine has a dual-wound stator configuration.

In this specific embodiment, the first electric machine 111 comprises a stator 311 having twelve slots 312 defined by teeth 313. The stator 311 has a single-layer concentrated winding arrangement having six coils 314, 315, 316, 317, 318, and 319. As indicated in the Figure, coils 314, 316, and 318 are connected as part of polyphase winding set 1, whilst coils 315, 317, and 319 are connected as part of polyphase winding set 2. In the present embodiment the coils forming part of the same polyphase winding set are connected in a star connection, however they may also be connected in a delta connection.

The coils 314 to 319 are wound on alternate teeth to provide physical isolation therebetween, improving fault tolerance. The teeth not carrying a coil are often referred to as spacer teeth. In an embodiment, the wound teeth and the spacer teeth are equal in width. In alternative embodiments, the wound teeth may be wider than the spacer teeth. In alternative embodiments, a winding arrangement could be adopted in which each tooth carries a coil, i.e. the stator has no spacer teeth. This may improve power density in applications where less fault tolerance is required.

In the present embodiment, the rotor 320 is a permanent magnet rotor, however the principles disclosed herein may be applied to other machine types such as synchronous reluctance machines.

FIGS. 4A & 4B

Figure 4B:
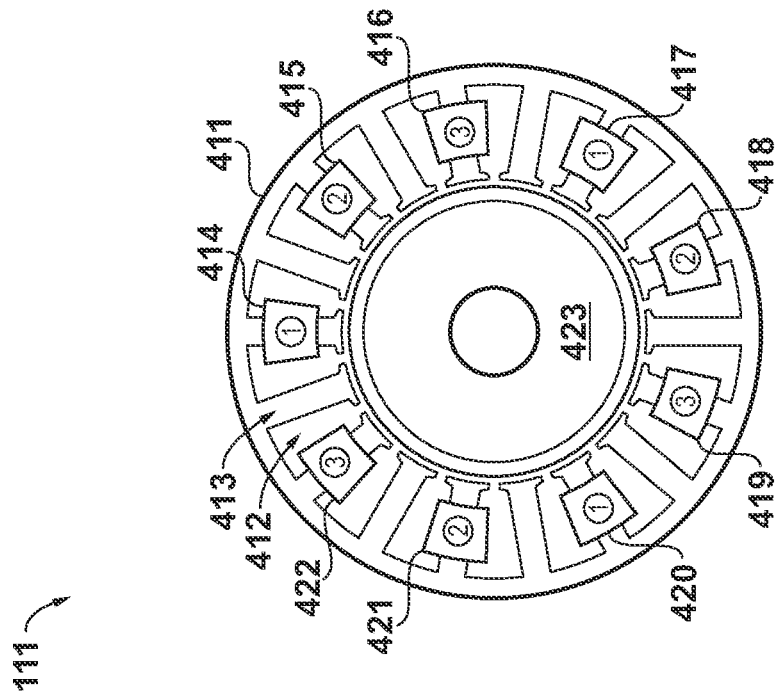
FIGS. 4A and 4B show, respectively, a second embodiment of the electrical system and a first electric machine therefor.
Figure 4A:
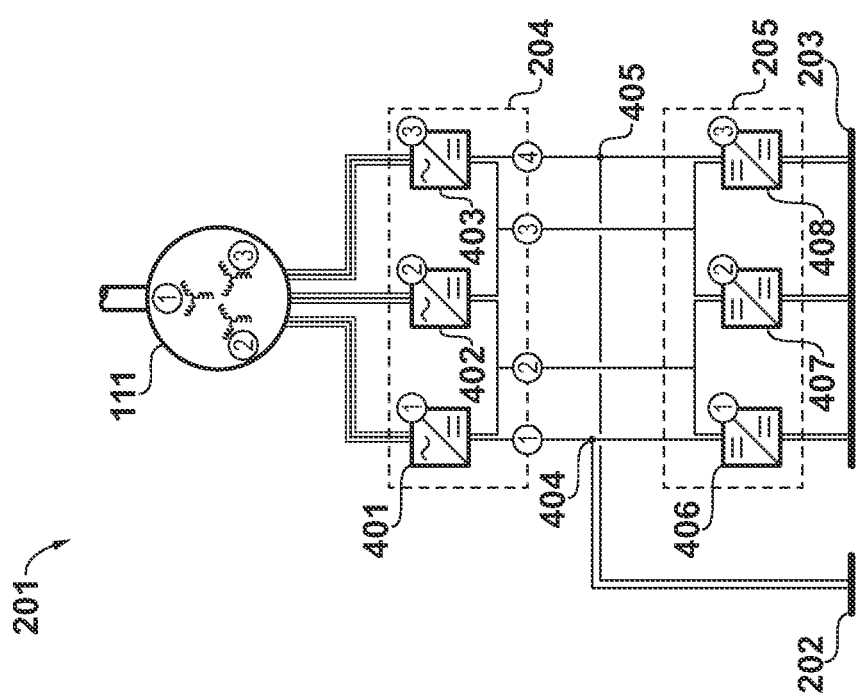

A second embodiment of the electrical system 201 in which N=3 is shown in FIG. 4A.

As with the embodiment described with reference to FIG. 3A, the first set of ac-dc converter circuits 204 comprises ac-dc converter circuits connected in an MML configuration. In this example, N=3 and thus three ac-dc converter circuits are provided, each having an associated index n: a first ac-dc converter circuit 401 having an index 1, a second ac-dc converter circuit 402 having an index 2, and a third ac-dc converter circuit 403 having an index 3. The ac-side of each ac-dc converter circuit drives a respective polyphase winding set having an associated index n=(1,2,3) in the electric machine 111.

The modular multilevel arrangement has, in this embodiment, P=4 outputs each having an associated index p. As described previously with reference to FIG. 3A, in general terms the potential difference between the pth output and the (p+q)th output of the MML configuration is qV/N, where q=(0, . . . , P-p). Thus in the specific example of FIG. 4A, the potential difference between the pth output and the (p+q)th output is qV/3, q=(0, . . . , P-p). The potential difference between the first and second dc output is therefore V/3; between the first and third dc output is 2V/3; and between the first and fourth dc output it is V.

It will be seen that in this example, N is odd and therefore there is no neutral point formed by the MML configuration, and thus no ground connection is made in this embodiment. In a different embodiment, a high impedance ground may be achieved by using a passive network such as an electrical filter or a resistive divider to ground, for example.

In the present example, the first dc network 202 is connected to a first node 404 at the first dc output of the MML configuration (index p=1), and a second node 405 at the fourth dc output (index p=4) of the MML configuration.

Conversion of voltage for the second dc network 203 is again performed by the set of dc-dc converter circuits 205, which in this embodiment comprises a first dc-dc converter circuit 406 which has an index n=1, a second dc-dc converter circuit 407 which has an index n=2, and a third dc-dc converter circuit 408 which has an index n=3. As with the embodiment of the FIG. 3A, a first dc interface of the nth dc-dc converter circuit is connected with the nth and (n+1)th dc outputs of the modular multilevel configuration. Each dc-dc converter circuit 406 to 408 outputs voltage W at their second dc interfaces for output to the second dc network 203.

In this example, each dc-dc converter circuit must only convert between a voltage V/3 and a voltage W.

A second embodiment of the first electric machine 111 is shown in FIG. 4B, which suitable for use in the system of FIG. 4A.

In this specific embodiment, the first electric machine 111 comprises a stator 411 having 18 slots 412 defined by teeth 413. The stator 411 has a single-layer concentrated winding arrangement having nine coils 414, 415, 416, 417, 418, 419, 420, 421, and 422. As indicated in the Figure, coils 414, 417, and 420 are connected as part of polyphase winding set 1, coils 415, 418, and 421 are connected as part of polyphase winding set 2, and coils 416, 419, and 422 are connected as part of polyphase winding set 3. In the present embodiment the coils forming part of the same phase are connected in a star connection, however they may also be connected in a delta connection.

The coils 414 to 422 are wound on alternate teeth to provide physical isolation between the phases, improving fault tolerance. Again, in alternative embodiments, a winding arrangement could be adopted in which each tooth carries a coil, i.e. the stator has no spacer teeth. This may improve power density in applications where less fault tolerance is required. Furthermore, in alternative embodiments, a distributed winding arrangement may be adopted. Spacer teeth may be used in such an arrangement to provide a degree of fault tolerance by isolation of coils. Should this aspect of fault tolerance not be required by the application, then spacer teeth may be omitted.

Again, in this embodiment, the rotor 423 is a permanent magnet rotor, however the principles disclosed herein may be applied to other machine types such as synchronous reluctance machines.

FIGS. 5A & 5B

Figure 5B:
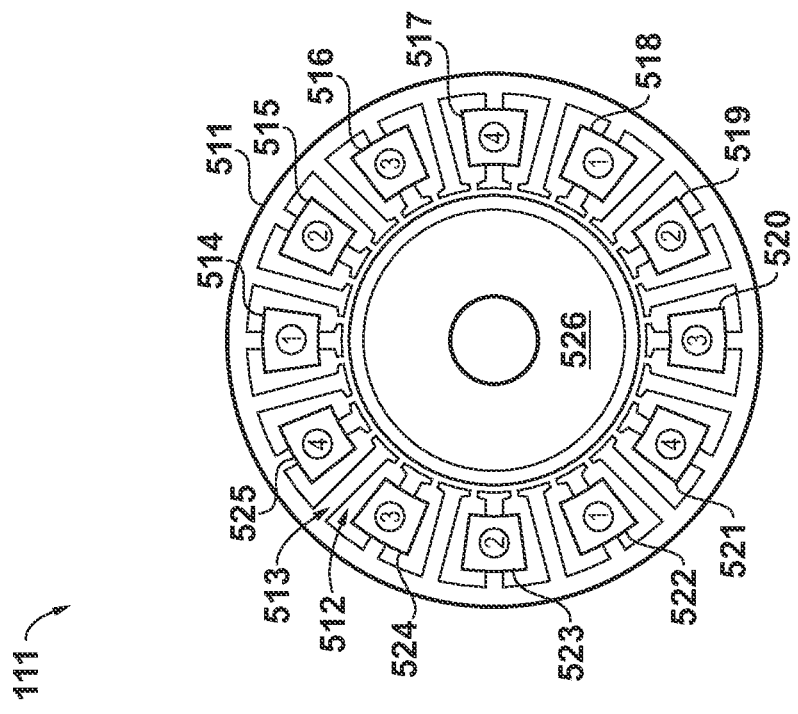
FIGS. 5A and 5B show, respectively, a third embodiment of the electrical system and a first electric machine therefor.
Figure 5A:
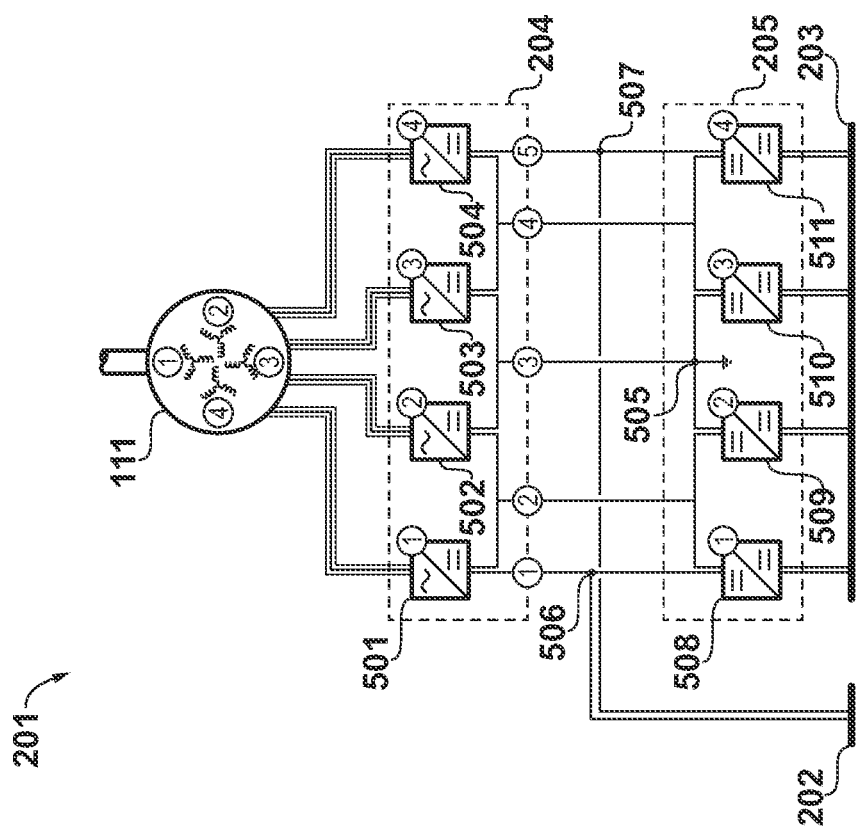

A third embodiment of the electrical system 201 in which N=4 is shown in FIG. 5A.

As with the embodiments described with reference to FIGS. 3A and 4A, the first set of ac-dc converter circuits 204 comprises ac-dc converter circuits connected in an MML configuration. In this example, N=4 and thus four ac-dc converter circuits are provided, each having an associated index n: a first ac-dc converter circuit 501 having an index 1, a second ac-dc converter circuit 502 having an index 2, a third ac-dc converter circuit 503 having an index 3, and a fourth ac-dc converter circuit 504 having an index 4. The ac-side of each ac-dc converter circuit drives a respective polyphase winding set having an associated index n=(1, . . . , 4) in the electric machine 111.

The MML configuration has, in this embodiment, P=5 outputs each having an associated index p. In this specific example, the potential difference between the pth output and the (p+q)th output is qV/4, q=(0, . . . , P−p). The potential difference between the first and second dc output is therefore V/4; between the first and third dc output is V/2; between the first and fourth dc output it is 3V/4; and between the first and fifth dc output it is V.

It will be seen that in this example, N is even and therefore a neutral point is formed at the third output of the MML configuration, allowing an optional ground connection to be made at a node 505 connected therewith.

In the present example, the first dc network 202 is connected to a first node 506 at the first dc output of the MML configuration (index p=1), and a second node 507 at the fifth dc output (index p=5) of the MML configuration.

Conversion of voltage for the second dc network 203 is again performed by the set of dc-dc converter circuits 205, which in this embodiment comprises a first dc-dc converter circuit 508 which has an index n=1, a second dc-dc converter circuit 509 which has an index n=2, a third dc-dc converter circuit 510 which has an index n=3, and a fourth dc-dc converter circuit 511 which has an index n=4. As with the embodiment of FIGS. 3A and 4A, a first dc interface of the nth dc-dc converter circuit is connected with the nth and (n+1)th dc outputs of the modular multilevel configuration. Each dc-dc converter circuit 508 to 511 outputs voltage W at their second dc interfaces for output to the second dc network 203.

In this example, each dc-dc converter circuit must only convert between a voltage V/4 and a voltage W. Thus, in example, V may be 3 kilovolts, and W may be 540 volts. The dc-dc converter circuits therefore only need to be configured to convert between 750 volts and 540 volts.

A third embodiment of the first electric machine 111 is shown in FIG. 5B, suitable for use in the third embodiment of the electrical system 201 shown in FIG. 5A.

In this specific embodiment, the first electric machine 111 comprises a stator 511 having 24 slots 512 defined by teeth 513. The stator 511 has a single-layer concentrated winding arrangement having twelve coils 514, 515, 516, 517, 518, 519, 520, 521, 522, 523, 524, and 525. As indicated in the Figure, coils 514, 518, and 522 are connected as part of polyphase winding set 1, coils 515, 519, and 523 are connected as part of polyphase winding set 2, coils 516, 520, and 524 are connected as part of polyphase winding set 3, and coils 517, 521, and 525 are connected as part of polyphase winding set 4. In the present embodiment the coils forming part of the same phase are connected in a star connection, however they may also be connected in a delta connection.

The coils 514 to 525 are wound on alternate teeth to provide physical isolation between the phases, improving fault tolerance.

Again, in alternative embodiments, a winding arrangement could be adopted in which each tooth carries a coil, i.e. the stator has no spacer teeth. This may improve power density in applications where less fault tolerance is required.

Again, in this embodiment, the rotor 526 is a permanent magnet rotor, however the principles disclosed herein may be applied to other machine types such as synchronous reluctance machines.

In alternative embodiments, the first electric machine could have a dual-stacked, dual wound configuration. In this way, the number of teeth required on the stator may be halved. This may be an option in the event that the radial dimension is constrained more than the axial dimension of the machine.

FIG. 6

Figure 6:
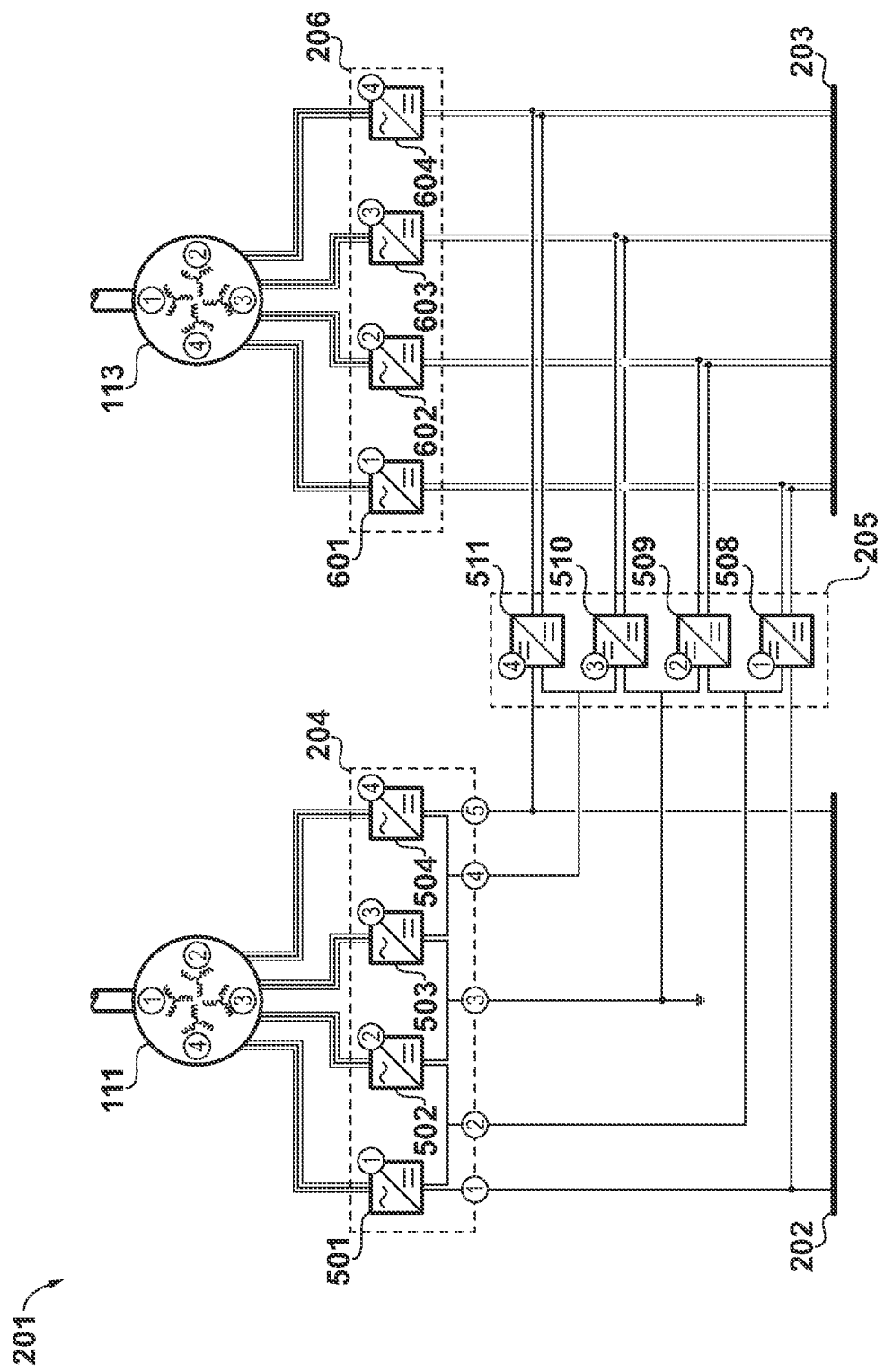
FIG. 6 shows an embodiment of the electrical system based on that of FIG. 5A.

A fourth embodiment of the electrical system 201 is shown FIG. 6, which builds upon the embodiment of FIG. 5A. Like features are therefore identified with like reference numerals.

In this embodiment, the second electric machine 113 also has N polyphase winding sets each having a respective index n=(1, . . . , N). For all n, the nth polyphase winding set of the second electric machine 113 is connected with an ac interface of the nth one of the second set of ac-dc converter circuits 206. In this example therefore, the second electric machine 113 comprises windings connected to form N=4 polyphase winding set each having a respective index n of from 1 to 4. In an embodiment, the second electric machine 113 may be of the same configuration as the first electric machine 111. In other embodiments, it may differ in configuration, for example number of coils per phase, number of teeth, alternate wound coils or not, etc.

The second set of ac-dc converter circuits 206 comprises N ac-dc converter circuits each having a respective index n=(1, . . . , N). For all n, a dc interface of the nth one of the second set of ac-dc converter circuits 206 is connected with a second dc interface of the nth one of the set of dc-dc converters 205. In an embodiment, the second set of ac-dc converter circuits 206 are configured in the same way as the first set of ac-dc converter circuits 204. In an embodiment, they may be configured different from the first set of ac-dc converter circuits 204. In an embodiment they are unidirectional inverters. In another embodiment, they are unidirectional rectifiers. In another embodiment, they are bidirectional converters. They may be H-bridge, NPC, or any other suitable topology.

In this example, with N=4, the second set of ac-dc converter circuits 206 comprises a first ac-dc converter circuit 601 having an index n=1, a second ac-dc converter circuit 602 having an index n=2, a third ac-dc converter circuit 603 having an index n=3, and a fourth ac-dc converter circuit 604 having an index n=4. The dc interface of the nth one of the second set of ac-dc converter circuits is connected with a second dc interface of the nth dc-dc converter circuit—thus the first ac-dc converter circuit 601 is connected with the second dc interface of the first dc-dc converter 508, and so on.

In this way, power transfer may be achieved between the electric machines and dc networks, despite the difference in voltage V and W.

FIG. 7

Figure 7:
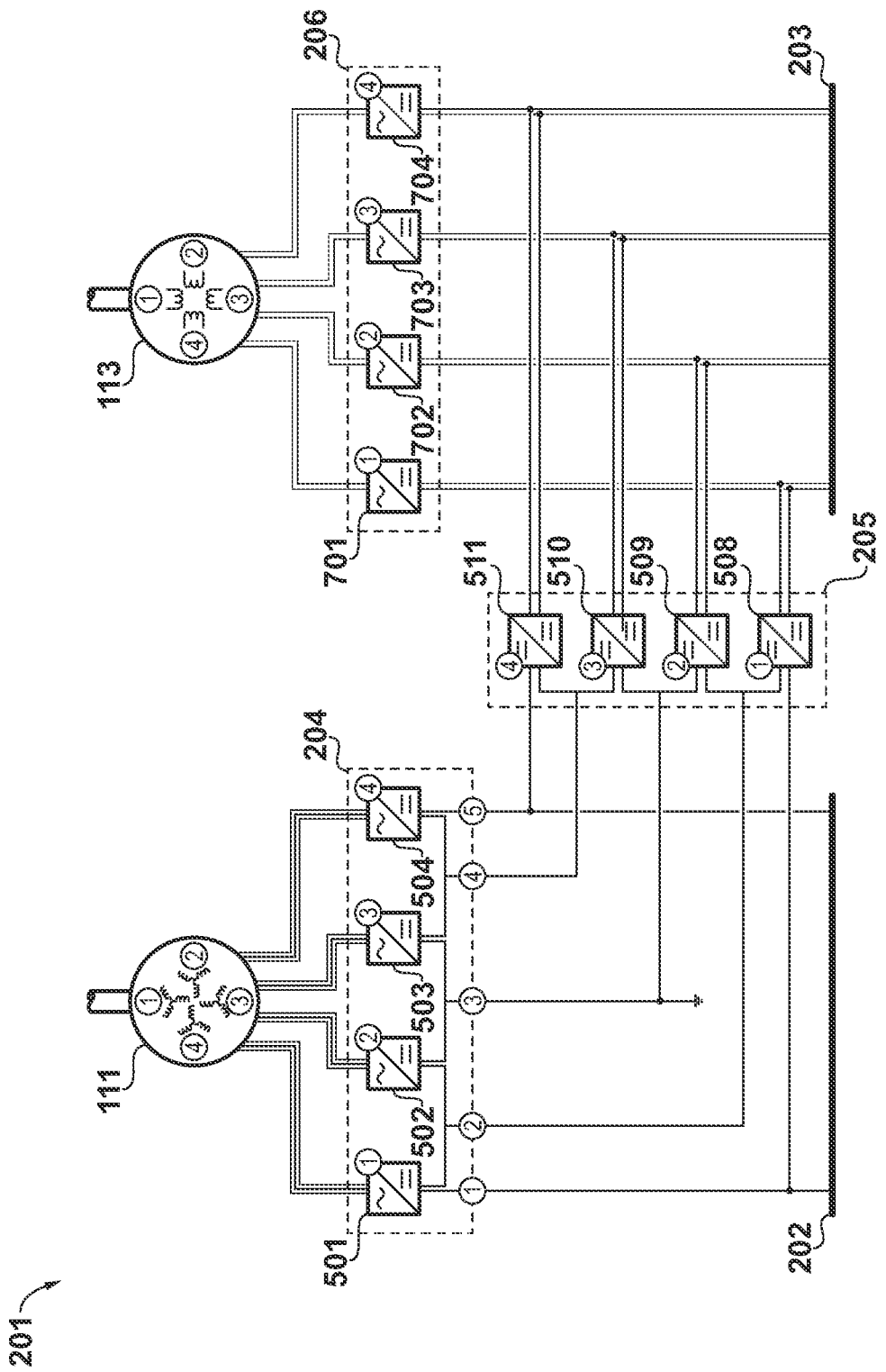
FIG. 7 shows another embodiment of the electrical system based on that of FIG. 5A.

A fifth embodiment of the electrical system 201 is shown FIG. 7, which also builds upon the embodiment of FIG. 5A. Like features are therefore identified with like reference numerals.

In general in this embodiment, the second electric machine 113 is a rotary electric machine having N≥2 independent phases. As will be understood by those skilled in the art, phase independence facilitates electrical isolation between the phases by driving each phase by its own dedicated converter circuit. This principle has been successfully demonstrated in the form of a drive system for an aircraft fuel pump as described in U.S. Pat. No. 8,823,332, which is assigned to the present applicant.

In the present embodiment, the ac-dc converter circuits are H-bridge converter circuits, the topology of which will be described with reference to FIG. 8. The ac-dc converter circuits may however be any suitable alternative topology such as neutral-point clamped, etc.

Referring to again to FIG. 7, in this embodiment the second set of ac-dc converter circuits 206 comprises N ac-dc converter circuits each having a respective index n=(1, . . . , N). For all n, the nth winding set of the second electric machine 113 is connected with an ac interface of the nth one of the second set of ac-dc converter circuits 206. In this configuration, each of second set of ac-dc converter circuits 206 is configured to provide an independent ac supply to the corresponding independent phase in the second electric machine 113. The dc interface of the nth one of the second set of ac-dc converter circuits 206 is connected with a second dc interface of the nth one of the set of dc-dc converter circuits 205.

Thus, in the specific example of FIG. 7, in which N=4, the second electric machine 113 comprises windings connected to form N=4 independent phases each having a respective index n of from 1 to 4.

The second set of ac-dc converter circuits 206 comprises a first ac-dc converter circuit 701 having an index n=1, a second ac-dc converter circuit 702 having an index n=2, a third ac-dc converter circuit 703 having an index n=3, and a fourth ac-dc converter circuit 704 having an index n=4. The dc interface of the nth one of the second set of ac-dc converter circuits is connected with a second dc interface of the nth dc-dc converter circuit—thus the first ac-dc converter circuit 701 is connected with the second dc interface of the first dc-dc converter 508, and so on. In this way, power may be transferred between different machine types operating on networks with different voltages.

FIG. 8

Figure 8:
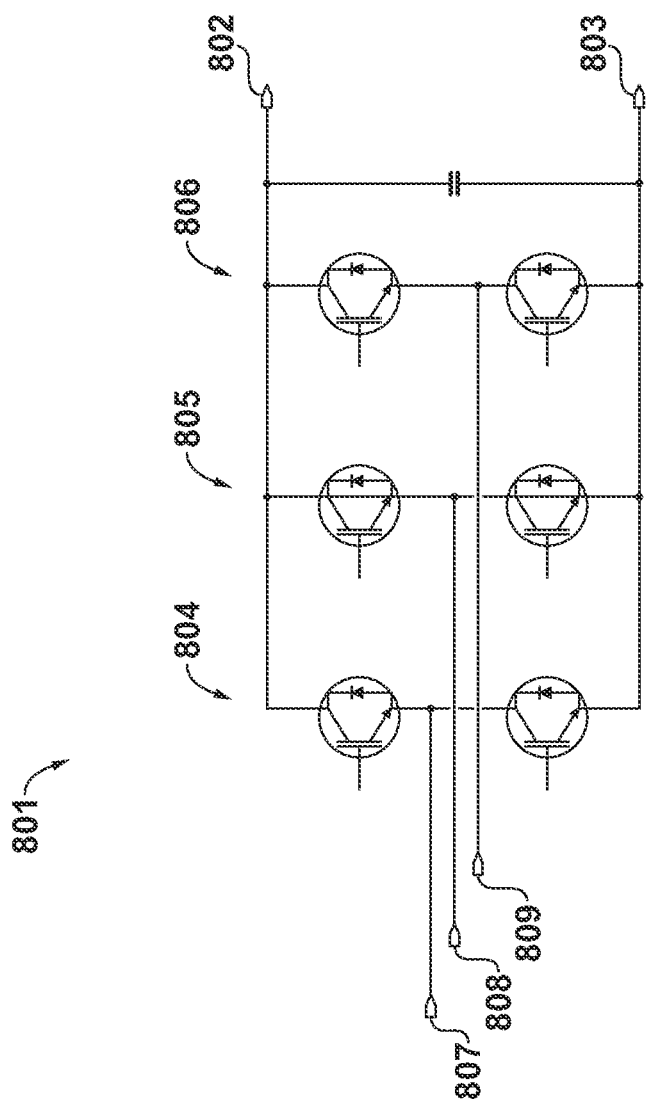
FIG. 8 shows an embodiment of one of the ac-dc converter circuits.

An embodiment of one of the ac-dc converter circuits is shown in FIG. 8. This circuit would be suitable for use as one of the first set of ac-dc converter circuits 204 in any of the embodiments as heretofore described, and for use as one of the second set of ac-dc converter circuits 206 in the embodiment of FIG. 6.

Those skilled in the art will recognise the ac-dc converter circuit 801 as a three-phase converter, having a first pair of terminals 802 and 803 forming a dc interface and three half-bridge legs 804, 805, and 806 formed of two switches with a respective polyphase terminal 807, 808, and 809 connected therebetween.

In this example, the dc-side terminal 802 provides the higher-level voltage output, whilst the other dc-side terminal 803 provides the lower-level voltage output.

In this example, control of the switches in the half-bridge legs is performed by a local embedded controller within the ac-dc converter circuit 801 (not shown), suitable types of which will be familiar to those skilled in the art. Local embedded controllers of this type typically accept speed, position, voltage, and/or torque references from the controller 207, and operate gate drives to effect pulse-width modulation-based control of the circuit, a technique which will be familiar to those skilled in the art.

FIG. 9

Figure 9:
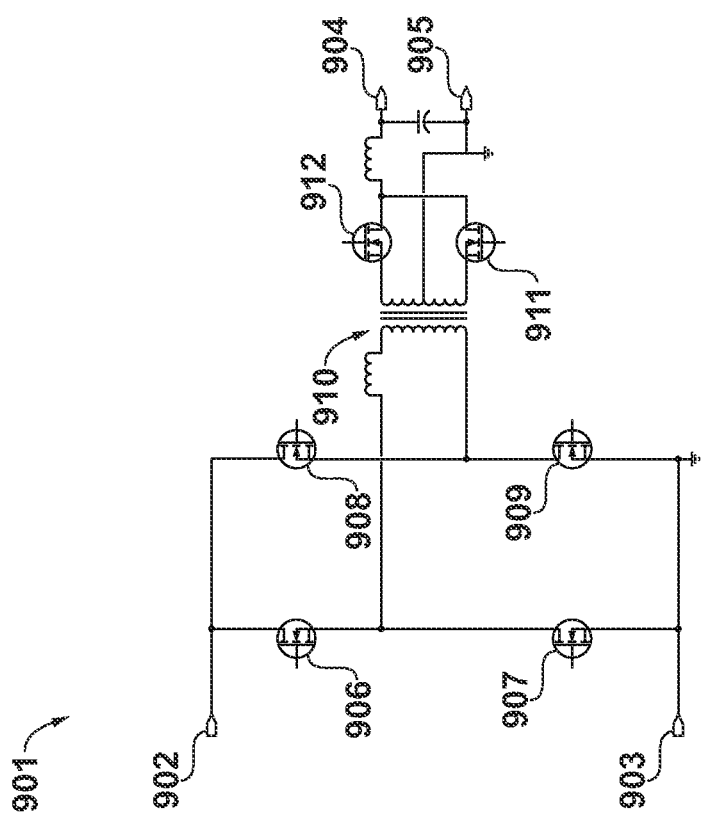
FIG. 9 shows an embodiment of one of the dc-dc converter circuits.

An embodiment of one of the dc-dc converter circuits is shown in FIG. 9. This circuit would be suitable for use as one of the set of dc-dc converter circuits 205 in any of the embodiments as heretofore described.

Those skilled in the art will recognise the dc-dc converter circuit 901 as a phase-shifted full bridge circuit, having a first pair of terminals 902 and 903 forming a first dc interface and a second pair of terminals 904 and 905 which form a second dc interface. In this example, four MOSFET switches 906, 907, 908, and 909 form a full bridge on the primary side of a transformer 910. Two MOSFET switches 911 and 912 provide push-pull switching on the secondary side of the transformer 910. The circuit may operate in buck or boost mode to effect conversion from voltage V/N to voltage W and vice versa. As will be appreciated by those skilled in the art, fast-acting diodes such as Schottky diodes may be placed in anti-parallel with the MOSFET switches primarily for reverse recovery and in some cases rectification, rather than relying on the body diodes of the MOSFETs for these functions.

As with the ac-dc converter circuit 801, in this embodiment pulse-width modulation-based control of the switches is performed by a local embedded controller within the dc-dc converter circuit 901 (not shown). Such controllers will be familiar to those skilled in the art.

FIG. 10

Figure 10:
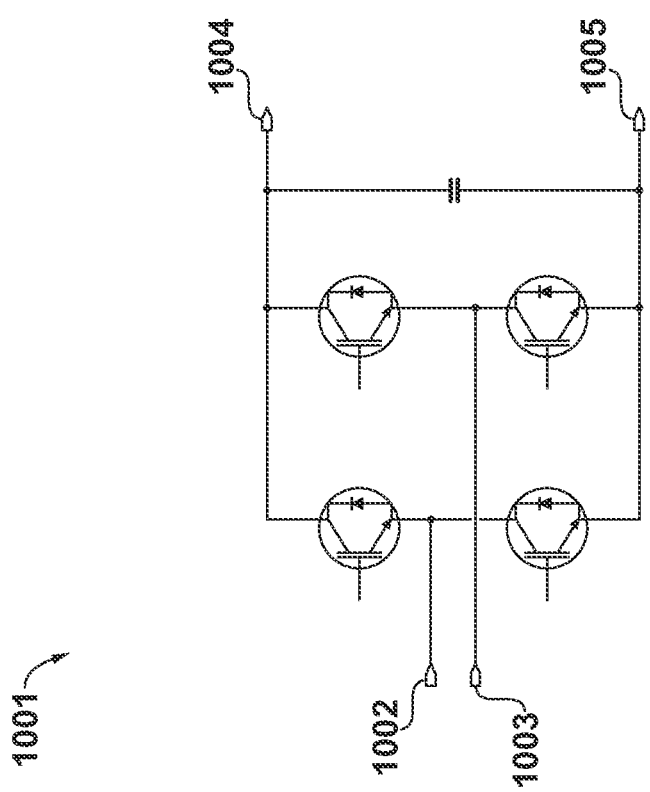
FIG. 10 shows an embodiment of one of the second set of ac-dc converter circuits.

An embodiment of one of the second set of ac-dc converter circuits is shown in FIG. 10 for use in the electrical system of FIG. 7.

Those skilled in the art will recognise the ac-dc converter circuit 1001 as an H-bridge circuit, having ac-side terminals 1002 and 1003 forming an ac interface for connection with phase windings of an electric machine, and dc-side terminals 1004 and 1005 which form a dc interface. As with the ac-dc converter circuit 801, in this embodiment pulse-width modulation-based control of the switches is performed by a local embedded controller within the dc-dc converter circuit 1001 (not shown). Such controllers will be familiar to those skilled in the art.

Various examples have been described, each of which feature various combinations of features. It will be appreciated by those skilled in the art that, except where clearly mutually exclusive, any of the features may be employed separately or in combination with any other features and the invention extends to and includes all combinations and sub-combinations of one or more features described herein.

The invention claimed is:

1. An electrical system for connecting a rotary electric machine to dc networks operating at different voltages V and W where V>W, the electric machine having N=4 polyphase winding sets each having a respective index n=(1, . . . , 4), the electrical system comprising:
   a first set of N=4 ac-dc converter circuits connected in a modular multilevel configuration, each ac-dc converter circuit having a respective index n=(1, . . . , 4) and an ac interface for connection with a corresponding nth winding set, and in which the modular multilevel configuration has P=5 dc outputs each having a respective index p=(1, . . . , 5) wherein the potential difference between the pth output and the (p+q)th output is qV/4, where q=(0, . . . , 5−p);
   a set of N=4 dc-dc converter circuits each having a respective index n=(1, . . . , 4) and being configured to convert dc power between a voltage V/4 at a first dc interface and a voltage W at a second dc interface, wherein, for all n, a first dc interface of the nth dc-dc converter circuit is connected with the p=nth and p=(n+1)th dc outputs of the modular multilevel configuration.

2. The electrical system of claim 1, in which $0.5 \text{ W} \leq V/4 \leq 2 \text{ W}$.

3. The electrical system of claim 2, in which $0.8 \text{ W} \leq V/4 \leq 1.3 \text{ W}$.

4. The electrical system of claim 1, in which W is 540 volts.

5. The electrical system of claim 1, in which V is from 1 kilovolt to 10 kilovolts.

6. The electrical system of claim 5, in which V is from 1 kilovolt to 3 kilovolts.

7. The electrical system of claim 1, in which the first set of N=4 ac-dc converter circuits are bidirectional ac-dc converter circuits.

8. The electrical system of claim 7, in which the first set of N=4 ac-dc converter circuits comprise H-bridges.

9. The electrical system of claim 7, in which the set of dc-dc converter circuits comprise phase-shifted full bridges.

10. The electrical system of claim 1, further comprising:
a second set of N=4 ac-dc converter circuits each having a respective index n=(1, . . . , 4), wherein for all n, a dc interface of the nth one of the second set of ac-dc converter circuits is connected with a second dc interface of the nth dc-dc converter;
a second electric machine having N polyphase winding sets, each having a respective index n=(1, . . . , 4), wherein for all n, the nth winding set of the second electric machine is connected with an ac interface of the nth one of the second set of ac-dc converter circuits.

11. The electrical system of claim 1, further comprising:
a second set of N=4 ac-dc converter circuits each having a respective index n=(1, . . . , 4), wherein for all n, a dc interface of the nth one of the second set of ac-dc converter circuits is connected with a second dc interface of the nth dc-dc converter;
a second rotary electric machine having N=4 independent phases each having a respective index n=(1, . . . , 4), wherein for all n, the nth phase of the second electric machine is connected with an ac interface of the nth one of the second set of ac-dc converter circuits.

12. The electrical system of claim 11, in which the second set of N=4 ac-dc converter circuits are bidirectional ac-dc converter circuits.

13. A gas turbine engine having a low-pressure spool and a high-pressure spool, and further comprising the electrical system of claim 11, in which the first rotary electric machine is connected with the low-pressure spool and the second rotary electric machine is connected with the high-pressure spool.

14. An arrangement comprising:
a first gas turbine engine having a first spool;
a second gas turbine engine different from the first gas turbine engine, and having a second spool; and
the electrical system of claim 11, in which the first rotary electric machine is connected with the first spool and the second rotary electric machine is connected with the second spool.

15. The electrical system of claim 1, in which the second set of N=4 ac-dc converter circuits comprise H-bridges.

* * * * *